United States Patent
Küng

(10) Patent No.: US 7,928,832 B2
(45) Date of Patent: Apr. 19, 2011

(54) METHOD FOR THE OPERATION OF RFID READ/WRITE DEVICES

(75) Inventor: Roland Küng, Wolfhausen (CH)

(73) Assignee: Intermec IP Corp., Everett, WA (US)

( * ) Notice: Subject to any disclaimer, the term of this patent is extended or adjusted under 35 U.S.C. 154(b) by 1106 days.

(21) Appl. No.: 11/582,179

(22) Filed: Oct. 17, 2006

(65) Prior Publication Data

US 2007/0063820 A1 Mar. 22, 2007

Related U.S. Application Data

(63) Continuation of application No. PCT/CH2005/000430, filed on Jul. 21, 2005.

(30) Foreign Application Priority Data

Oct. 9, 2004 (CH) ...................................... 1678/04

(51) Int. Cl.
*H04Q 5/22* (2006.01)
(52) U.S. Cl. .................... 340/10.1; 340/505; 340/870.18
(58) Field of Classification Search ................. 340/10.1, 340/505, 870.18; 455/41.2, 561, 131
See application file for complete search history.

(56) References Cited

U.S. PATENT DOCUMENTS

| | | | | |
|---|---|---|---|---|
| 6,384,712 B1 * | 5/2002 | Goldman et al. | ............ | 340/10.3 |
| 6,463,039 B1 * | 10/2002 | Ricci et al. | .................... | 370/277 |
| 6,717,516 B2 * | 4/2004 | Bridgelall | .................. | 340/572.1 |
| 7,084,739 B2 * | 8/2006 | Taki et al. | ..................... | 340/10.1 |

FOREIGN PATENT DOCUMENTS

| | | |
|---|---|---|
| CA | 2405894 | 4/2004 |
| EP | 0 680 002 A2 | 11/1995 |
| EP | 1 239 634 A2 | 9/2002 |
| WO | WO 2004/004196 A1 | 1/2004 |
| WO | WO-2004015614 | 2/2004 |

OTHER PUBLICATIONS

International Search Report; International Application No. PCT/CH2005/000430, European Patent Office, mailed Oct. 28, 2005, 2 pages.

* cited by examiner

*Primary Examiner* — Vernal U Brown
(74) *Attorney, Agent, or Firm* — Perkins Coie LLP

(57) ABSTRACT

A method of operating a first RFID read/write device and at least one second RFID read/write device is disclosed herein. The first and second RFID read/write devices respectively comprise an RF part and a baseband part with a digital signal processor. The first and second RFID read/write devices are arranged at a usable wireless transmission distance from one another. The method comprises generating a Reader Service Signal in its baseband form in the signal processor and combining the Reader Service Signal with an RFID signal in its baseband form comprising a carrier signal, so that the RFID signal has the Reader Service Signal embedded to it in amplitude, frequency or phase. Thereafter, the RFID signal with the embedded Reader Service Signal is shifted into an RF band and the RFID signal is transmitted as a transmission signal wirelessly by the RFID read/write devices. The transmission signal from the first RFID read/write device is received by a number of electronic tags for the purpose of communicating with the first RFID read/write device. Simultaneously, the transmission signal from the first RFID read/write device is received at least by the one second RFID read/write device for the purpose of communicating with the first RFID read/write device.

21 Claims, 2 Drawing Sheets

METHOD FOR THE OPERATION OF RFID READ/WRITE DEVICES

CROSS-REFERENCE TO RELATED APPLICATIONS

This application is a continuation of PCT patent application no. PCT/CH2005/000430, filed Jul. 21, 2005.

FIELD

The invention relates the field of communication technology and a method for the operation of RFID read/write devices.

BACKGROUND

An RFID system essentially comprises an RFID read/write device (reader) and electronic tags. The latter are able to operate passively, i.e. without a battery, but are reliant on the continual presence of a carrier signal transmitted by the read device, this carrier signal also being called a power carrier. RFID systems with read ranges of several meters use UHF or microwave frequencies. The RFID read/write device itself comprises a transmitter with a baseband assembly and a radio-frequency assembly (RF assembly) and also a receiver consisting of a radio-frequency part (RF part) and a baseband part.

To achieve reading distances in the range of a few meters, a transmission power of approximately 1 watt (30 dBm) needs to be generated and radiated in the case of passive electronic tags. On the other hand, receivers in the RFID read/write devices need to detect the low level of the response signal which is reflected by the tags. As the density of RFID read/write devices within a given 3D volume increases there is the risk of system interference by the individual RFID signals, which, in comparison with the tag response signals, often arrive at the receiver with higher signal level than the response signal.

A numerical example for a transmission power of +30 dBm generated at a distance of 10 m from an RFID read/write device operated at 868 MHz results in a jamming noise signal level of −20 dBm at the receiver input. However, the useful signal from the tag at a distance of approximately 4 m is just −70 dBm in the UHF range. The digital representation of the obviously weak useful signal downstream of an A/D converter in the receiver is thus characterized by a low resolution. If indeed a plurality of RFID signals are received, communication with tags is barely possible any longer, since besides the signals from the RFID read/write devices there are also a large number of intermodulation products further occupying the useful frequency band. Although it is proposed, based on national radio regulations, that an RFID read/write device performs a Listen Before Talk (LBT) operation before the start of transmission, in order to check whether the frequency channel is not in use, this results in a high level of inefficiency in applications with a large number of uncoordinated RFID read/write devices. Individual RFID read/write devices can be intermittently shaded by moving objects and still cause interference.

Other RFID read/write devices in turn do not cause interference when they are transmitting simultaneously because their antennas are currently radiating in a different direction. Interference by other RFID read/write devices can therefore be expected at any time. Methods which provide the individual RFID read/write devices with synchronous timeslots are inefficient because there are often no tags in front of an RFID read/write device and in that case the timeslot passes unused. There are often not enough frequency bands available for separating the RFID signals in the frequency range. At best, the frequency hopping method which the national radio regulations may permit for RFID can alleviate the situation somewhat by virtue of a plurality of RFID read/write devices sharing at least some frequencies, and the number of collisions being lower.

The regulating authorities for RFID in the UHF and microwave ranges propose introducing a LBT phase ahead of an interrogation cycle, said phase involving the transmitter in an RFID read/write device being off and the received signal being analyzed over a time interval T0. This received signal contains the interrogation signals from other RFID read/write devices, and it is possible to decide whether or not the transmitter is allowed to be turned on. If the RFID read/write devices have suitable means which allow them to be identified then a plurality of RFID read/write devices are independently able to consult with one another in a cooperative sense in order to avoid mutual interference. Such consultation may be made possible by adding a Bluetooth (BT) or wireless LAN (WLAN) function to the RFID read/write device, for example.

Combined RFID read/write devices which contain RFID and BT, as described in US2002/0126013 and CA 2405894, can obviously also be used in this way for cooperation between read devices. The drawback of BT or WLAN based consultation is the higher level of hardware complexity or additional occupancy of the frequency band (e.g. RFID in the 2.4 GHz ISM band). An improved variant as presented in WO 2004/004196 could be achieved by reconfiguring a Software Defined Radio baseband part (SDR) contained in an RFID read/write device to produce a BT or WLAN function. The drawback of this method is that it is firstly suitable only for frequency bands which permit RFID and BT or WLAN emission (currently only ISM 2.4 GHz) and secondly that reconfiguring the SDR loses valuable operating time for the RFID read/write process while the SDR is performing BT or WLAN functions, for example.

WO 2004/015614 proposes synchronizing all the RFID carrier signals from multiple RFID read/write devices in order to prevent beat frequency signals (AC) in direct conversion receivers which would not be easy to filter out. The interfering AC components are produced by the slightly differing crystal frequencies in each RFID read/write device. This synchronization is complex, however, because it requires a reference transmitter or wiring for the RFID read/write devices. Besides the aforementioned BT or WLAN functions, wired networking by Ethernet or an RS232 interface of adjacent RFID read/write devices may be mentioned, or similar means in which a master undertakes time-based coordination of all read operations.

A conventional RFID read/write device is shown in FIG. 1. The present technology is based on what is known as Software Defined Radio (SDR). An RFID read/write device 10 comprises a software defined baseband part (SDR) 11 and an RF part 12. In SDR based transmission/reception installations of this kind, the complex-value signals are conditioned or processed purely arithmetically in a signal processor 13 such that they now need only be shifted into the radio frequency band by means of linear converters (up-converter and down-converter). A TX converter 17 in the transmitter is fed with a complex baseband signal (in phase and quadrature signals) which is output by the signal processor 13 via a double digital/analog (D/A) converter 15. The output signal is forwarded to the transmission antenna 19. From the reception antenna 18, received signals are converted into a complex baseband signal (in phase and quadrature signals) by means of an RX converter 16 and are forwarded to a double analog/digital (A/D) converter 14 and accepted by the signal processor 13. A known reception architecture uses what is known as a Direct Conversion Stage (DCS) for the RX converter 16 in order to get from the radio frequency (RF) into baseband. For the purpose of signaling between RFID read/write devices, a BT or WLAN baseband stage 21 can be incorporated into the device, which baseband stage can in the best case also use the converters 16, 17 and antennas 18, 19.

SUMMARY

It would therefore be advantageous to develop a method for the operation RFID read/write devices further such that a number of simultaneously operated, adjacent RFID read/write devices can operate in controlled fashion interference-free without the need of a conventional wired or wireless additional installation.

In one embodiment, the invention proposes a method for interchanging information and data between RFID read/write devices—subsequently read devices for short—using the already present power carrier signal, required for supplying power to an electronic tag, for interchanging information and data between read devices. This carrier signal is modulated with the interrogation signal for the purpose of system-related data transmission between read device and tag. In the text below the carrier signal, with or without the tag interrogation signal added, is designated generally as an RFID signal (in its baseband form). By way of example, this modulation can advantageously be done in amplitude, or be in line with the existing RFID standard, such that the demodulation on a tag can be kept simple. In this context, the modulation index is in the order of magnitude of several 10% at a data rate of 100 kBit/s, for example, for the same reason of simplicity. Amplitude modulations of less than 1% are not picked up by tags. It would naturally also be conceivable for the carrier signal additionally to be digitally modulated in frequency using FSK or in phase using PSK. Combinations of these can also be used, of course, depending on the radio regulations and standards, particularly when a subcarrier method is being used for modulation. While the tags are sending their data to the read device, the transmitter in the read device needs to continue to transmit the carrier signal without an interrogation signal for the tags in order to continue to supply the tags with power. A suitable carrier signal for communication between read devices is thus available during the entire transaction time with a tag. For the communication between a plurality of read devices, at least one embodiment of the invention advantageously involves each read device generating a further signal, the Reader Service Signal, in its baseband form in a digital signal processor and combining it with the RFID signal (in its baseband form)—comprising the carrier signal and the interrogation signal—specifically such that the carrier signal in its baseband form has an ASK, FSK or PSK modulated Reader Service Signal embedded to it in amplitude, frequency or phase and is then shifted into the radio frequency band in an RF part. Carrier signal modulation in amplitude or additive extension in the form of a single sideband signal such that the spectral components come to rest on both sides or on one side of the frequency channel's band border or in another spectral gap without impairing the useful data traffic between the read device and the tag appears particularly easily suitable. This is achieved in a known manner by using a modulated subcarrier to produce the Reader Service Signal. The small degree of modulation means that the Reader Service Signal is not recognized by the tags, since this Reader Service Signal has no interfering effect at a level of 40 dB below the carrier signal, for example. The high power of the carrier signal (+30 dBm) means that this level can still be received with a good signal-to-noise ratio by other read devices in the environment, however.

Furthermore, the method using the aforementioned subcarrier modulation has the great advantage that in a Direct Conversion Stage receiver the Reader Service Signal does not appear as a DC voltage (DC), which means that the usually interfering DC component can be filtered out downstream of an RX converter in the receiver without losing the Reader Service Signal.

In all cases, each read device advantageously transmits not only service informations but also an identification sequence (also called an address). Using the received address, a first read device can establish what other read device is interfering with the transaction to and from its tags for any reason and can then ask this interfering source to set up its operation cooperatively. By way of example, a cooperative response may take effect in coordination of the time slots of channel use, in a synchronized sequence of use in multi-frequency channel systems or in a priority regulation. The additional modulation produces no additional complexity for hardware in the read device itself, since these signals can be generated purely arithmetically within the SDR architecture and can be demodulated by means of software. Besides service information, it is also possible to transmit status commands in broadcast mode or in addressed mode, such as time markers, reservation of time or frequency channel resources or priority claims (operation with external trigger). In particular, a network of read devices can be put into a synchronous state when a station is distinguished as a master and, as a special form of Reader Service Signal, modulates the reference time onto the carrier signal. All read devices in a reception range (which are therefore potential sources of interference) then set their internal clock. Frequency hopping or other methods can in this way be managed synchronously and can accordingly be operated without collision; again, this also requires no additional hardware in the network. In installations with a plurality of read devices which are intended to process the same group of tags (e.g. palette stack), information about tags which have already been processed successfully can also be interchanged between the read devices in order to optimize the complexity of work and instances of double reading in situ.

If there is sufficient bandwidth available, the Reader Service Signal is advantageously applied above the useful range for the actual read operation. Alternatively, the Reader Service Signal can also be sent at the same time only during the time for which the tags are being called and can be muted while the reflected data from the tags are being received, in order to reduce impairment during reading. In another embodiment, the subcarrier used for the Reader Service Signal can be modulated with a pseudo-random sequence (PN) and can in this way be decorrelated from the tags' response signal, that is to say separated through correlation with a copy of the PN sequence in a second read device's receiver. In this case, the frequency band may fully or partially match the band of the tag response signal. Recovery of the original sequence is not a problem in the read device on account of the available computation power which, in line with at least one embodiment of the invention, is inherent in a Software Defined Radio baseband part (SDR). If each read device uses different, uncorrelated PN sequences which are known to the read devices then even when a plurality of read devices are transmitting simultaneously it is possible to detect a collision, to identify the source of interference, and hence to take cooperative measures.

If an RFID system comprising a number of read devices is equipped with the novel Reader Service Signal technology then it is possible to change a network from uncoordinated operation to a cooperative operating state with the aim of wasting as little reading time as possible and of identifying even large quantities of tags with as much certainty as possible. A plurality of readers can be mounted in a tight space (for example a gate or tunnel) without reciprocal interference by the high carrier signal powers after a cooperation phase has taken place.

As integration density of electronics increases, it is also possible to increase the performance of systems using the known methods of space-time processing. Such read devices equipped with adaptive antenna arrays can allow totally new cooperative read operations, such as two-dimensional scanning of an area by two read devices with 90-degree offset antenna arrays or antenna polarization, as a result of electronic control of the directional diagram in the signal processor or on transmission antennas or reception antennas, and also the time-based synchronization of the read processes. The information interchange required for this is effected wirelessly and without any fundamental time delay using the Reader Service Signal. The method can be extended to any form of surface with more than two readers in a manner which is easy to understand.

BRIEF DESCRIPTION OF THE DRAWINGS

Embodiments of the invention are explained below by way of example with reference to figures. Items which are the same have basically been identified using the same reference symbols in the figures, in which, in purely schematic form.

DESCRIPTION

Figure 2:
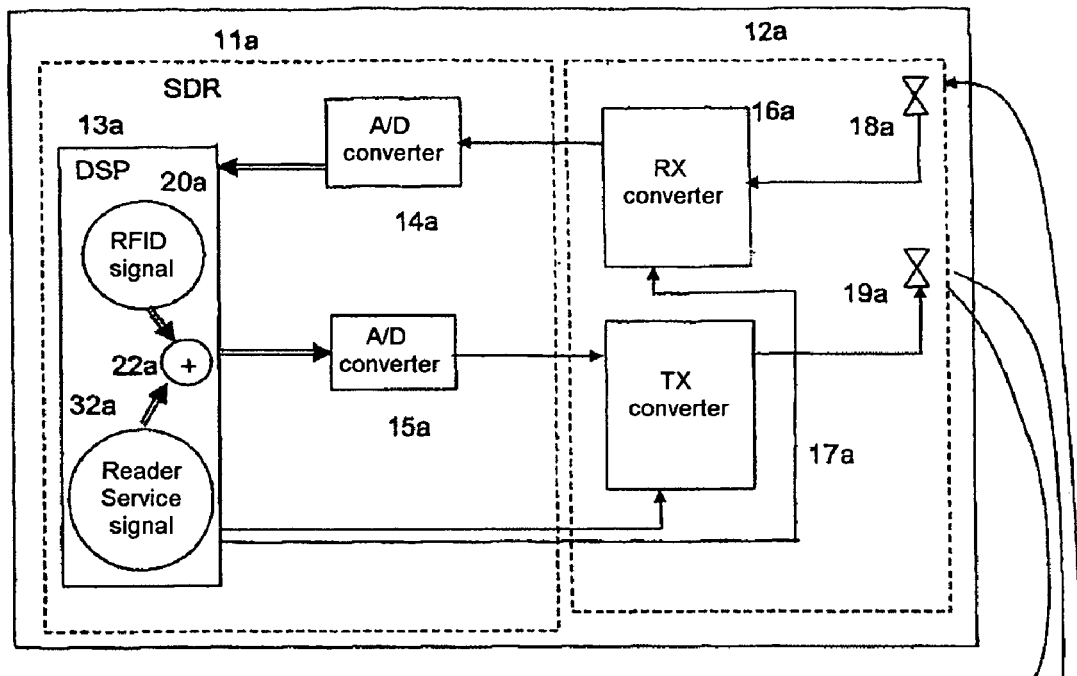
FIG. 2 shows an apparatus for carrying out an inventive method for operating RFID read/write devices.
Figure 2:
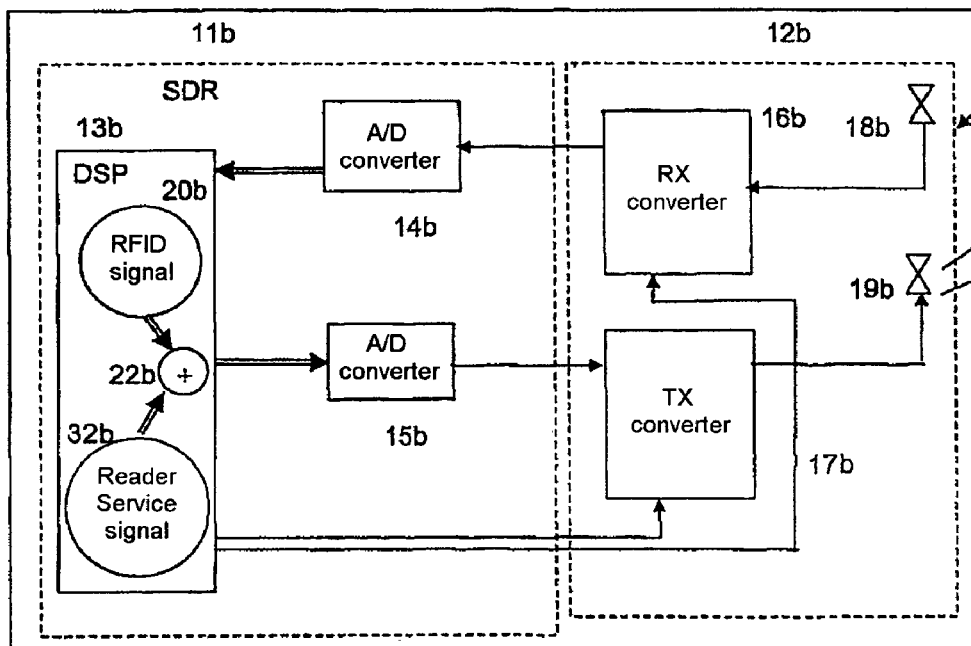

FIG. 2 shows a first and a second RFID read/write device—subsequently read device for short—10a, 10b which are arranged next to one another at a transmission distance. Essentially, these read devices 10a, 10b comprise a software defined baseband part 11a, 11b (SDR) and a radio frequency part 12a, 12b (RF part). In the SDR 11a, 11b, a respective digital signal processor (DSP) 13a, 13b is connected to an A/D converter 14a, 14b into a D/A converter 15a, 15b. In addition, the DSP 13a, 13b has a connection to an RX converter 16a, 16b and to a TX converter 17a, 17b in the RF part 12a, 12b. The RX converters 16a, 16b are respectively coupled to a reception antenna 18a, 18b, and the TX converters 17a, 17b are respectively coupled to a transmission antenna 19a, 19b. Shown between the read devices 10a, 10b are two electronic tags E1, E2. Curved arrows, respectively coming from the transmission antennas 19a, 19b mean that these transmission antennas respectively radiate signals to the adjacent read device and to the tags E1, E2.

Figure 1:
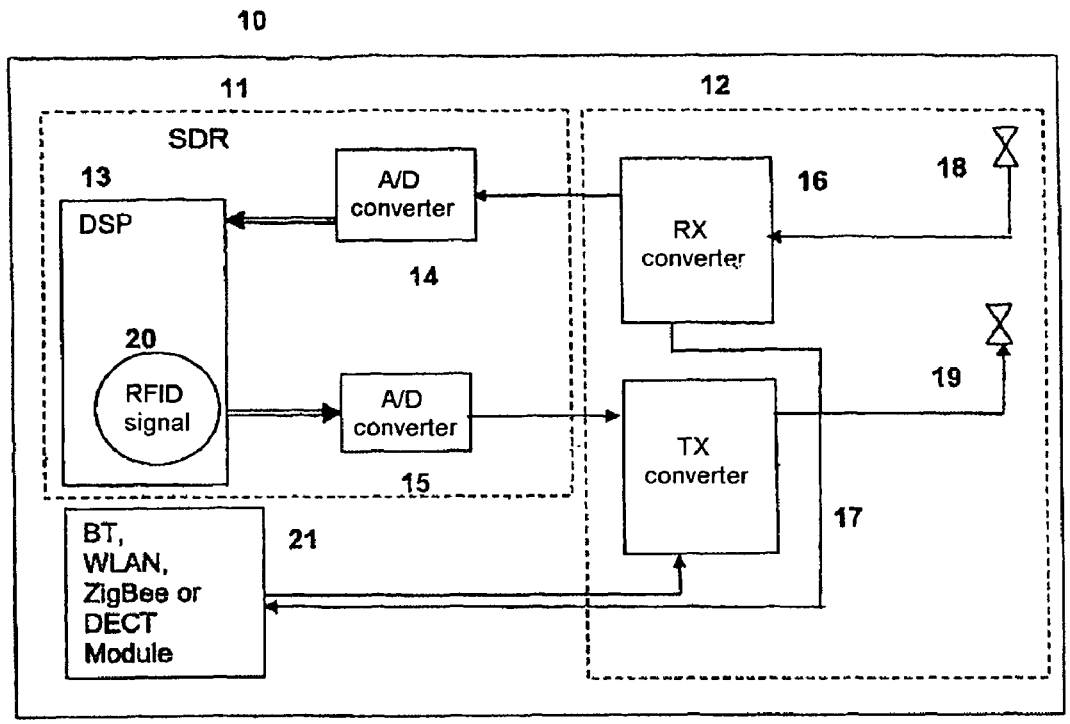
FIG. 1 shows an apparatus for carrying out a method for operating RFID read/write devices based on the prior art.
Figure 3:
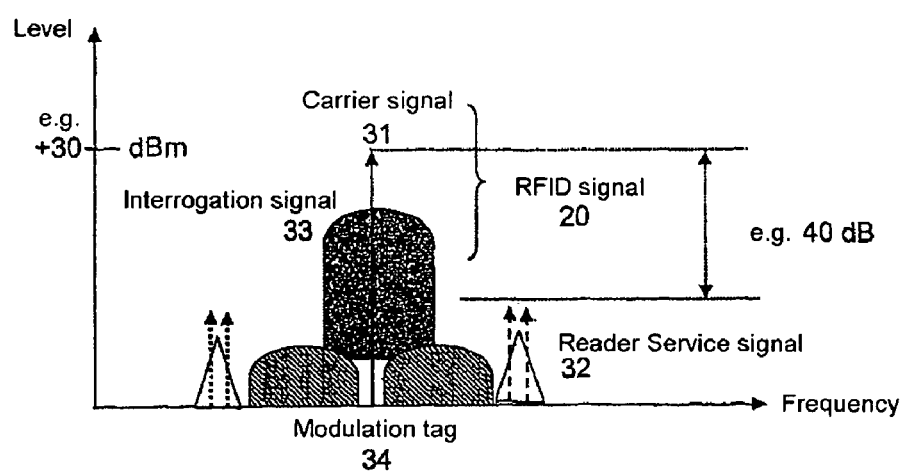
FIG. 3 shows an exemplary spectrum in the radio frequency range (RF range) with a transmission signal from the RFID read/write device, a response signal from a tag and an exemplary Reader Service Signal.

FIG. 3 shows, by way of example, a spectrum in the radio frequency range (RF range) with a transmission signal, comprising a carrier signal 31 and an interrogation signal 33 from the read devices 10a, 10b. In addition, this spectrum shows a response signal 34 from a tag E1, E2 and an exemplary Reader Service Signal 32 based on an embodiment of the invention.

For the purpose of interchanging information and data between the read devices 10a, 10b, the present power carrier signal 31, which is needed for supplying power to the electronic tags E1, E2, is used. This carrier signal 31 is already being modulated with the interrogation signal 33 for the purpose of system-related data transmission between the read devices 10a, 10b and the tags E1, E2. By way of example, this modulation can advantageously be done in amplitude, specifically such that the demodulation on a tag E1, E2 can be kept simple. In this case, the modulation index is in the order of magnitude of several 10% at a data rate of 100 kBit/s, for example, for the same reason of simplicity.

It would naturally also be conceivable for the carrier signal 31 additionally to be digitally modulated in frequency using FSK or in phase using PSK. Combinations of these can also be used, of course, depending on the radio regulations and standards, particularly when a subcarrier method is being used for modulation. While the tags E1, E2 send their data to the read device 10a, 10b (modulation tag 34), the transmitter (TX converter 17a, 17b) in the read device 10a, 10b needs to continue to transmit the carrier signal 31 even without an interrogation signal 33 for the tags E1, E2, in order to continue to supply the tags with power. A suitable carrier signal is thus available for the whole transaction time with the tag E1, E2.

For the communication between the read devices 10a, 10b, the disclosed embodiment of the invention involves each read device generating a further signal, the Reader Service Signal 32, in its baseband form in a digital signal processor 20a, 20b and combining it with the RFID signal (in its baseband form)—comprising the carrier signal 31 and the interrogation signal 33 for the tags E1, E2—in the combinational element 22a, b, specifically such that the carrier signal 31 in its baseband form has the ASK, FSK or PSK modulated Reader Service Signal 32 embedded to it in amplitude, frequency or phase and is then shifted into the radio frequency band in the RF part 12a, 12b.

Besides the service information, the read devices 10a, 10b also transmit an identification sequence (also called an address). Using a received address from an adjacent read device 10b, a first read device 10a establishes what other read device is interfering with the transactions to and from its tags E1, E2 for any reason, and the first read device 10a then asks the interfering read device 10b to respond cooperatively. By way of example, a cooperative response may take effect in coordination of time slots of the channel use, in a synchronized sequence of use in multi-frequency channel systems, including frequency hopping methods, or in priority regulation.

Besides service information, it is also possible to transmit status commands in broadcast mode or in addressed mode, such as time markers, reservation of time or frequency channel resources or priority claims (operation with external trigger). In particular, a network of read devices can be put into a synchronous state when a station is distinguished as a master and, as a special form of Reader Service Signal 32, modulates a reference time onto the carrier signal 31. All read devices 10a, 10b in the reception range (which are therefore potential sources of interference) then set their internal clock. Frequency hopping or other methods can in this way be managed synchronously and can accordingly be operated without collision.

In installations with a plurality of read devices which are intended to process the same group of tags (e.g. palette stack), information about tags which have already been processed successfully can also be interchanged between the read devices in order to avoid the complexity of work and instances of double reading in situ.

If there is sufficient bandwidth available, the Reader Service Signal 32 is advantageously applied above the useful range for the actual read operation, i.e. above the interrogation signal 33 and the modulation tag 34. Alternatively, the Reader Service Signal 32 can also be sent at the same time only during the time for which the tags E1, E2 are being called and can be muted while the reflected data 34 from the tags E1, E2 are being received, in order to reduce impairment during reading.

In another embodiment of the inventive method, the Reader Service Signal 32 is modulated with a pseudo-random sequence (PN) and in this way is decorrelated from the response signal from the tags E1, E2, that is to say separated through correlation with a copy of the PN sequence in the read device's receiver. In this case, the frequency band may fully or partially match the band of the tag response signal 34. If each read device uses different, uncorrelated PN sequences which are known to the read devices then even when a plurality of read devices are transmitting simultaneously it is possible to detect a collision, to identify the source of interference, and hence to take cooperative measures.

As integration density of electronics increases, it is also possible to increase the performance of systems using the known methods of space-time processing. If the read devices 10a, 10b are equipped with adaptive antenna arrays then new cooperative read operations, such as two-dimensional scanning of an area by two read devices with 90-degree offset antenna arrays or antenna polarization, can be made possible as a result of electronic control of the directional diagram in the signal processor 13a, 13b or in the transmission antennas 19a, 19b, or reception antennas 18a, 19b, and also the time-based synchronization of the read processes. The information interchange required for this is effected wirelessly and without any fundamental time delay likewise using the Reader Service Signal 32. The method can be extended to any surfaces with more than two read devices 10a, 10b in a manner which is easy to understand.

The embodiments shown in the figures are used to provide a clear explanation of the invention with the aid of examples. It is clear to a person skilled in the art that there are further options for refining the invent on which cannot be portrayed here for reasons of space. Thus, while the invention disclosed herein has been described in terms of several preferred embodiments, there are numerous alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF REFERENCE SYMBOLS 10, 10a, 10b RFID read/write device
11, 11a, 11b Software defined baseband part (SDR)
12, 12a, 12b Radio-frequency part (RF part)
13, 13a, 13b Digital signal processor (DSP)
14, 14a, 14b AD converter
15, 15a, 15b DA converter
16, 16a, 16b RX converter
17, 17a, 17b TX converter
18, 18a, 18b Reception antenna
19, 19a, 19b Transmission antenna
20, 20a, 20b RFID signal
21 Communication unit
22, 22a, 22b Combinational element
31 Carrier signal
32 Reader Service Signal
33 Interrogation signal from RFID read/write device
34 Modulation tag
E1, E2 Electronic tags

What is claimed is:

1. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulated or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device; and simultaneously receiving the transmission signal from the first RFID read/write device at least by the one second RFID read/write device for the purpose of communicating with the first RFID read/write device through the reader service signal;

wherein the reader service signal is arranged in the frequency spectrum as sidebands for amplitude modulation or single sideband modulation of the carrier signal; and wherein the reader service signal contains components in the spectrum in the form of amplitude modulation of the carrier signal to permit filtering of a DC component.

2. The method of claim 1 wherein a further transmission signal from the second RFID read/write device is received by a number of electronic tags for the purpose of communicating with the second RFID read/write device, and wherein the further transmission signal from the second RFID read/write device is simultaneously received at least by the first RFID read/write device for the purpose of communicating with this second RFID read/write device.

3. The method of claim 1 wherein the RFID signal from the first or from the second RFID read/write device is amplitude-modulated with a small swing or is combined with a single sideband signal, so that the reader service signal is produced in the transmission signal at a frequency space fd from the carrier signal, the transmission signal resulting in the second and first RFID read/write devices is an AC signal at approximately the frequency fd with a high signal-to-noise ratio, and the reader service signal is not recognized by the electronic tags.

4. The method of claim 1 wherein the first RFID read/write device performs the function of a master in a network of RFID read/write devices, and other RFID read/write devices in the network orient themselves according to the first RFID read/write device.

5. The method of claim 1 wherein a network comprising the first RFID read/write device and further RFID read/write devices is formed automatically.

6. The method of claim 5 wherein the reader service signal comprises (i) an address for the first or the second RFID read/write device, and (ii) at least one time marker for synchronizing a number of operating timeslots or a number of operating frequency channels for the transmission signal from the first or the second RFID read/write device.

7. The method of claim 6 wherein each RFID read/write device in the network produces a network plan, for the purpose of controlling adjacent RFID read/write devices or for the purpose of forming subgroups of RFID read/write devices.

8. The method of claim 6 wherein the reader service signal comprises (i) an address for the first or the second RFID read/write device, and (ii) at least one time marker for synchronizing a number of operating timeslots or a number of operating frequency channels for the transmission signal from the first or the second RFID read/write device.

9. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulated or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device; and simultaneously receiving the transmission signal from the first RFID read/write device at least by the one second RFID read/write device for the purpose of communicating with the first RFID read/write device through the reader service signal;

wherein the reader service signal is produced in the baseband part using digital signal processing and is then shifted into the RF range using a transmission part of the RF part, wherein the transmission part comprises a number of linear basic blocks, and also, in the case of reception, is shifted out of the RF range using a reception part of the RF part, wherein the reception part comprises a number of linear basic blocks, and is evaluated in the baseband part using digital signal processing.

10. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulated or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device; and simultaneously receiving the transmission signal from the first RFID read/write device at least by the one second RFID read/write device for the purpose of communicating with the first RFID read/write device through the reader service signal;

wherein, for RFID read/write devices operating on the basis of a frequency hopping method, a number of reader service signal time markers are used to attain a synchronous channel use sequence that permits a plurality of RFID read/write devices to operate on the basis of the frequency hopping method without collision.

11. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulated or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device through the reader service signal; and simultaneously receiving the transmission signal from the first RFID read/write device at least by the one second RFID read/write device for the purpose of communicating with the first RFID read/write device;

wherein the reader service signal is additionally modulated with a pseudo-random sequence, so that the reader service signal from a plurality of simultaneously transmitting RFID read/write devices can be separated through correlation on the basis of specific correlation properties of each sequence.

12. The method of claim 11 wherein the reader service signal with the pseudo-random sequence from the first and second RFID read/write devices for an electronic tag appears as a noise signal and can be detected only by the second or first RFID read/write device which knows the pseudo-random sequence.

13. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulated or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device through the reader service signal; and simultaneously receiving the transmission signal from the first RFID read/write device at least by the one second RFID read/write device for the purpose of communicating with the first RFID read/write device;

wherein the first RFID read/write device performs the function of a master in a network of RFID read/write devices, and other RFID read/write devices in the network orient themselves according to the first RFID read/write device.

14. The method of claim 13 wherein each RFID read/write device in the network produces a network plan, for the purpose of controlling adjacent RFID read/write devices or for the purpose of forming subgroups of RFID read/write devices.

15. The method of claim 13 wherein the reader service signal comprises (i) an address for the first or the second RFID read/write device, and (ii) at least one time marker for synchronizing a number of operating timeslots or a number of operating frequency channels for the transmission signal from the first or the second RFID read/write device.

16. The method of claim 13 wherein
the RFID signal from the first or from the second RFID read/write device is amplitude-modulated with a small swing or is combined with a single sideband signal, so that the reader service signal is produced in the transmission signal at a frequency space fd from the carrier signal,
the transmission signal resulting in the second and first RFID read/write devices is an AC signal at approximately the frequency fd with a high signal-to-noise ratio, and
the reader service signal is not recognized by the electronic tags.

17. The method of claim 13 wherein, for RFID read/write devices operating on the basis of a frequency hopping method, a number of reader service signal time markers are used to attain a synchronous channel use sequence that permits a plurality of RFID read/write devices to operate on the basis of the frequency hopping method without collision.

18. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulated or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device; and simultaneously receiving the transmission signal from the first RFID read/write device at least by the one second RFID read/write device for the purpose of communicating with the first RFID read/write device through the reader service signal;

wherein a network comprising the first RFID read/write device and further RFID read/write devices is formed automatically.

19. The method of claim 18 wherein each RFID read/write device in the network produces a network plan, for the purpose of controlling adjacent RFID read/write devices or for the purpose of forming subgroups of RFID read/write devices.

20. The method of claim 18 wherein the reader service signal comprises (i) an address for the first or the second RFID read/write device, and (ii) at least one time marker for synchronizing a number of operating timeslots or a number of operating frequency channels for the transmission signal from the first or the second RFID read/write device.

21. A method of operating a first RFID read/write device and at least one second RFID read/write device, the method comprising:

providing the first and second RFID read/write devices respectively comprising an RF part and a baseband part, the baseband part including a signal processor, wherein the first and second RFID read/write devices are arranged at a usable wireless transmission distance from one another;

generating a reader service signal in its baseband form in the signal processor and combining the reader service signal with an RFID signal in its baseband form comprising a carrier signal, so that the RFID signal has the reader service signal modulating or embedded to it in amplitude, frequency or phase;

shifting the RFID signal with the reader service signal into an RF band and transmitting the RFID signal as a transmission signal wirelessly by the RFID read/write devices;

receiving the transmission signal from the first RFID read/write device by a number of electronic tags for the purpose of communicating with the first RFID read/write device; and simultaneously receiving the transmission signal from the first RFID read/write device at least by the one second RFID read/write device for the purpose of communicating with the first RFID read/write device through the reader service signal;
wherein the first and second RFID read/write devices use their baseband parts and a reception antenna and a transmission antenna to transmit a number of parameters for antenna selection, antenna configuration and antenna radiation control and also for time-based synchronization of procedures using the reader service signal, for the purpose of a cooperative scan operation, understood in the geometrical sense, on an area, a surface or a volume.

* * * * *